US012812149B2

(12) United States Patent
Venkatrav et al.

(10) Patent No.: US 12,812,149 B2
(45) Date of Patent: Nov. 24, 2026

(54) VIRTUAL AND INDEX ASSEMBLY FOR CLOUD-BASED VIDEO PROCESSING

(71) Applicant: NETFLIX, INC., Los Gatos, CA (US)

(72) Inventors: Subrahmanya Venkatrav, San Jose, CA (US); Chao Chen, Mountain View, CA (US); Cyril Concolato, Palo Alto, CA (US); Xiaomei Liu, Los Gatos, CA (US); Anush Moorthy, Redwood City, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/528,102

(22) Filed: Nov. 16, 2021

(65) Prior Publication Data

US 2023/0089154 A1 Mar. 23, 2023

Related U.S. Application Data

(60) Provisional application No. 63/247,235, filed on Sep. 22, 2021.

(51) Int. Cl.

| | |
|---|---|
| ***H04N 19/426*** | (2014.01) |
| ***G06F 16/71*** | (2019.01) |
| ***H04N 19/172*** | (2014.01) |
| ***H04N 19/177*** | (2014.01) |
| ***H04N 19/70*** | (2014.01) |

(52) U.S. Cl.

CPC ........... *H04N 19/426* (2014.11); *G06F 16/71* (2019.01); *H04N 19/172* (2014.11); *H04N 19/177* (2014.11); *H04N 19/70* (2014.11)

(58) Field of Classification Search

CPC ....................................................... G06F 16/71

See application file for complete search history.

(56) References Cited

U.S. PATENT DOCUMENTS

| | | | | |
|---|---|---|---|---|
| 9,338,209 | B1 * | 5/2016 | Begen | H04L 65/752 |
| 9,913,187 | B1 * | 3/2018 | Pawar | H04W 36/0022 |
| 10,693,642 | B1 * | 6/2020 | Saxton | H04L 9/065 |
| 2009/0282444 | A1 * | 11/2009 | Laksono | H04N 21/2387 725/89 |
| 2014/0098850 | A1 * | 4/2014 | Wolfram | H04N 21/8352 375/E7.154 |
| 2014/0143301 | A1 | 5/2014 | Watson et al. | |
| 2015/0188974 | A1 | 7/2015 | Garcia-Mendoza Sanchez et al. | |
| 2017/0048536 | A1 | 2/2017 | Forehand et al. | |

(Continued)

OTHER PUBLICATIONS

Alon, Barak "MezzFS—Mounting object storage in Netflix's media processing platform" Netflix Technology Blog, Mar. 6, 2019, 11 pages.

(Continued)

*Primary Examiner* — Richard L Bowen

(74) *Attorney, Agent, or Firm* — Artegis Law Group, LLP

(57) ABSTRACT

Various embodiments set forth a computer-implemented method for processing media files comprising receiving an index file corresponding to a source media file, wherein the index file indicates location information associated with a plurality of encoded portions of the source media file; retrieving one or more encoded portions included in the plurality of encoded portions from at least one storage device based on the index file; and generating at least part of an encoded version of the source media file based on the one or more encoded portions.

21 Claims, 10 Drawing Sheets

(56) References Cited

U.S. PATENT DOCUMENTS

| | | | | |
|---|---|---|---|---|
| 2017/0366833 | A1 | 12/2017 | Amidei et al. | |
| 2018/0124146 | A1* | 5/2018 | Chen | H04N 21/258 |
| 2018/0191801 | A1* | 7/2018 | Chen | H04L 65/612 |
| 2019/0082217 | A1* | 3/2019 | Hertel | H04N 21/2405 |
| 2020/0021634 | A1 | 1/2020 | Li et al. | |
| 2020/0204841 | A1* | 6/2020 | Van Brandenburg | H04N 21/6587 |
| 2021/0064416 | A1 | 3/2021 | San Miguel et al. | |
| 2021/0067819 | A1 | 3/2021 | Sen et al. | |

OTHER PUBLICATIONS

Aaron, Anne and Ronca, David "High Quality Video Encoding at Scale" Netflix Technology Blog, Dec. 9, 2015, 6 pages.

International Search Report for application No. PCT/US2022/076119 dated Jan. 10, 2023.

Gutiérrez-Aguado et al., "Cloud-based elastic architecture for distributed video encoding: Evaluating H.265, VP9, and AV1", Journal of Network and Computer Applications, vol. 171, Sep. 1, 2020, 18 pages.

* cited by examiner

VIRTUAL AND INDEX ASSEMBLY FOR CLOUD-BASED VIDEO PROCESSING

CROSS-REFERENCE TO RELATED APPLICATIONS

This application claims the priority benefit of United States provisional patent application titled, "VIRTUAL AND INDEX ASSEMBLY FOR CLOUD-BASED VIDEO PROCESSING," filed on Sep. 22, 2021, and having Ser. No. 63/247,235. The subject matter of this related application is hereby incorporated herein by reference.

BACKGROUND

Field of the Various Embodiments

The various embodiments relate generally to computer science and video processing and, more specifically, to techniques for virtual and index assembly for cloud-based video processing.

Description of the Related Art

A typical video streaming service provides users with access to a library of media titles that can be viewed on a range of different endpoint devices. In operation, a given client device connects to the video streaming service under a variety of connection conditions and, therefore, can be susceptible to differing available network bandwidths. In an effort to ensure that a given media title can be streamed to a client device without playback interruptions, irrespective of the available network bandwidth, a video streaming service typically pre-generates multiple different encodings of the media title. For example, "lower-quality" encodings usually are streamed to the client device when the available network bandwidth is relatively low, and "higher-quality" encodings usually are streamed to the client device when the available network bandwidth is relatively high.

To generate the different encodings of a given media title, a video streaming service typically encodes the media title multiple times via a video encoding pipeline. The video encoding pipeline eliminates different amounts of information from a source video associated with the given media title to generate multiple encoded videos, where each encoded video is associated with a different bitrate. An encoded video associated with a given bitrate can then be streamed to a client device without or with mitigated playback interruptions when the available network bandwidth is greater than or equal to that bitrate. However, due to the complexity of the encoding algorithms that are typically used to generate an encoded video, generating the different encodings of the given media title is quite computationally intensive.

In one approach, to generate multiple encoded videos, a video streaming service utilizes a cloud-based video processing pipeline. The video processing pipeline divides a source media file for a given media title into multiple discrete portions or "chunks." Each chunk can be encoded independently from the other chunks by different instances of an encoder executing on different cloud computing instances. Thus, the encoding process can be performed largely in parallel across the different cloud computing instances, which reduces the amount of time needed to encode the source media file. Subsequently, an assembler combines the different encoded chunks into a single encoded video file. A packager prepares the encoded video file for streaming to a client device, for example, by adding container and system layer information, adding digital rights management (DRM) protection, or performing audio and video multiplexing.

One drawback of the cloud-based video processing pipeline described above is that, at each stage of the video processing pipeline, each cloud computing instance has to download the input data required for that pipeline stage and then upload the resulting output data to a data store accessible by the other cloud computing instances, which allows the output data to be accessed for and utilized in subsequent pipeline stages. For example, to generate an encoded video file, an assembler has to download multiple encoded chunks, combine those encoded chunks into a single encoded video file, and then upload the encoded video file. The packager then needs to download that encoded video file in order to prepare the encoded video file for streaming to various client devices. Notably, each of the encoder, assembler, and packager introduces overhead to the video processing pipeline, including processing time, network bandwidth usage, and data download and upload time, and each also requires storage space for storing respective output data. Consequently, for larger source media files, the amount of overhead and storage required to generate multiple encoded video files can be quite significant.

As the foregoing illustrates, what is needed in the art are more effective techniques for generating encoded video files.

SUMMARY

Various embodiments set forth a computer-implemented method for processing media files. The method includes receiving an index file corresponding to a source media file, wherein the index file indicates location information associated with a plurality of encoded portions of the source media file; retrieving one or more encoded portions included in the plurality of encoded portions from at least one storage device based on the index file; and generating at least part of an encoded version of the source media file based on the one or more encoded portions.

At least one technical advantage of the disclosed techniques relative to the prior art is that the disclosed techniques reduce the amount of overhead required when assembling and packaging multiple encoded video portions. In that regard, an assembler combines data associated with multiple encoded video portions into an index file, rather than combining multiple encoded video portions into a single encoded video file. Accordingly, with the disclosed techniques, the assembler does not need to download the multiple encoded video portions and does not need to upload the encoded video file. As a result, the network bandwidth and time required to download the input data used by the assembler, upload the output data produced by the assembler, and transmit the output data to the packager are reduced relative to prior art techniques. Additionally, the storage space used when storing the output data produced by the assembler is also reduced. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

Overview

A typical media processing pipeline encodes and packages media content for consumption by media players, such as streaming to different endpoint devices, or by media editing tools for further processing. However, prior art techniques for generating the packaged media can have significant overhead and storage requirements. For example, to generate an encoded video file, an encoder has to download multiple chunks of a source media file, encode each chunk, and then upload multiple encoded chunks. An assembler has to download multiple encoded chunks, combine those encoded chunks into a single encoded video file, and then upload the encoded video file. A packager then needs to download that encoded video file in order to prepare the encoded video file for streaming to various client devices. Accordingly, each stage of the video processing pipeline introduces overhead, including processing time, network bandwidth usage, and data download and upload time, and each stage also requires storage space for storing respective output data.

In various embodiments, an assembler performs index assembly of multiple encoded chunks rather than physical assembly of the multiple encoded chunks. The assembler generates an index file that corresponds to the single encoded media file that would have been generated by combining the multiple encoded chunks. The index file indicates the locations of the multiple encoded chunks within cloud storage. Additionally, the index file indicates the locations of encoded video frames within each encoded chunk. The index file can be used by other applications, such as a packager, to identify and retrieve the multiple encoded chunks from cloud storage for further processing, rather than retrieving the encoded media file.

Advantageously, using the disclosed techniques, the amount of overhead required when assembling and packaging an encoded media file is reduced compared to prior art techniques. For example, the assembler only needs to acquire and combine location information and other metadata associated with the multiple encoded chunks and upload an index file. The assembler does not need to download and process the multiple encoded video portions and does not need to upload the encoded video file. Accordingly, the network bandwidth required to download the input data used by the assembler, the processing time required for the assembler to generate output data, the storage space used when storing the output data, and the network bandwidth and time required to upload the output data and transmit the output data to a packager, are reduced relative to prior art techniques.

System Overview

Figure 1:
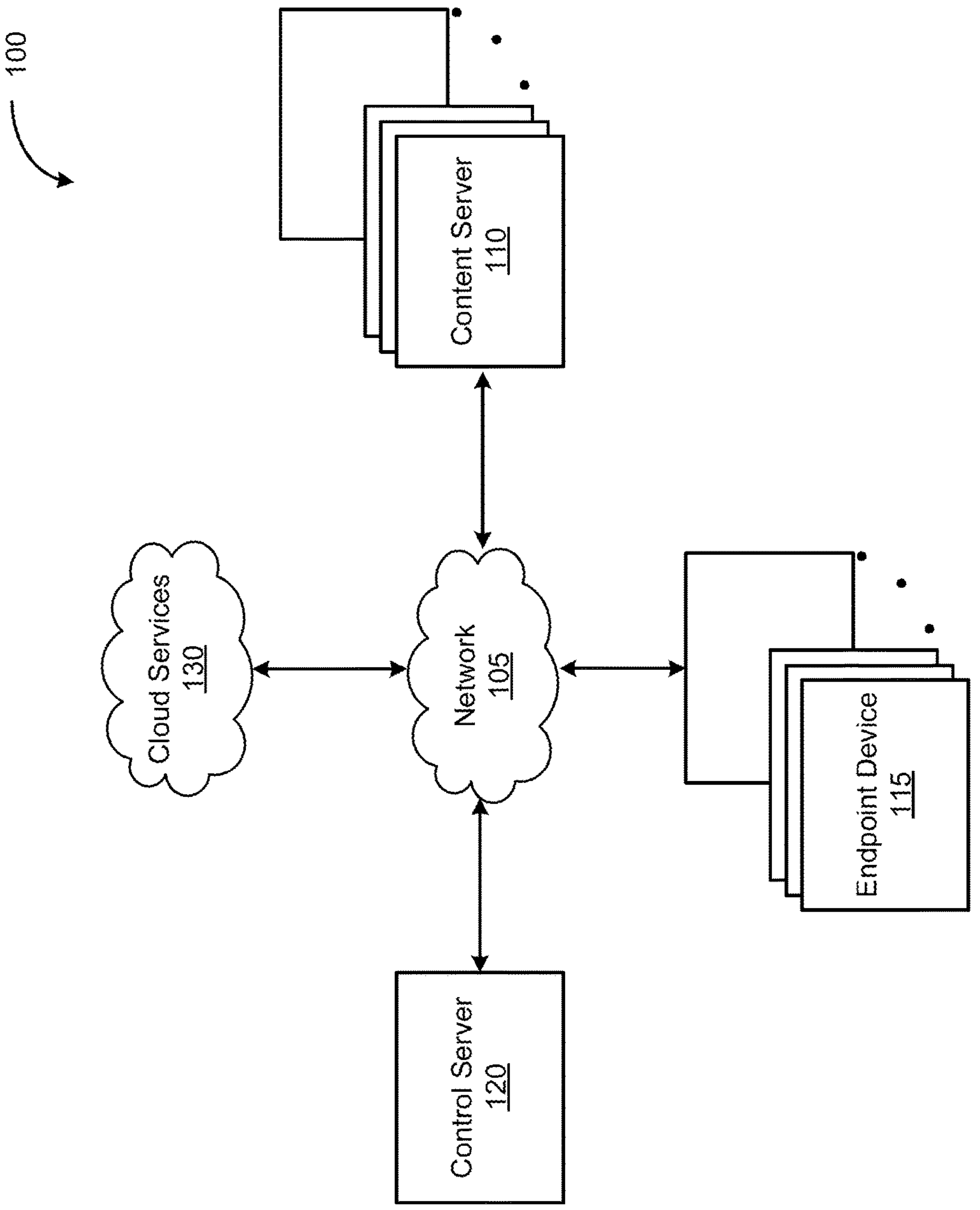
FIG. 1 illustrates a network infrastructure configured to implement one or more aspects of the various embodiments.

FIG. 1 illustrates a network infrastructure configured to implement one or more aspects of the various embodiments. As shown, network infrastructure 100 includes one or more content servers 110, a control server 120, and one or more endpoint devices 115, which are connected to one another and/or one or more cloud services 130 via a communications network 105. Network infrastructure 100 is generally used to distribute content to content servers 110 and endpoint devices 115.

Each endpoint device 115 communicates with one or more content servers 110 (also referred to as "caches" or "nodes") via network 105 to download content, such as textual data, graphical data, audio data, video data, and other types of data. The downloadable content, also referred to herein as a "file," is then presented to a user of one or more endpoint devices 115. In various embodiments, endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Network 105 includes any technically feasible wired, optical, wireless, or hybrid network that transmits data between or among content servers 110, control server 120, endpoint device 115, cloud services 130, and/or other components. For example, network 105 could include a wide area network (WAN), local area network (LAN), personal area network (PAN), WiFi network, cellular network, Ethernet network, Bluetooth network, universal serial bus (USB) network, satellite network, and/or the Internet.

Each content server 110 may include one or more applications configured to communicate with control server 120 to determine the location and availability of various files that are tracked and managed by control server 120. Each content server 110 may further communicate with cloud services 130 and one or more other content servers 110 to "fill" each content server 110 with copies of various files. In addition, content servers 110 may respond to requests for files received from endpoint devices 115. The files may then be distributed from content server 110 or via a broader content distribution network. In some embodiments, content servers 110 may require users to authenticate (e.g., using a username and password) before accessing files stored on content servers 110. Although only a single control server 120 is shown in FIG. 1, in various embodiments multiple control servers 120 may be implemented to track and manage files.

In various embodiments, cloud services 130 may include an online storage service (e.g., Amazon® Simple Storage Service, Google® Cloud Storage, etc.) in which a catalog of files, including thousands or millions of files, is stored and accessed in order to fill content servers 110. Cloud services 130 also may provide compute or other processing services. Although only a single instance of cloud services 130 is shown in FIG. 1, in various embodiments multiple cloud services 130 and/or cloud service instances may be implemented.

Figure 2:
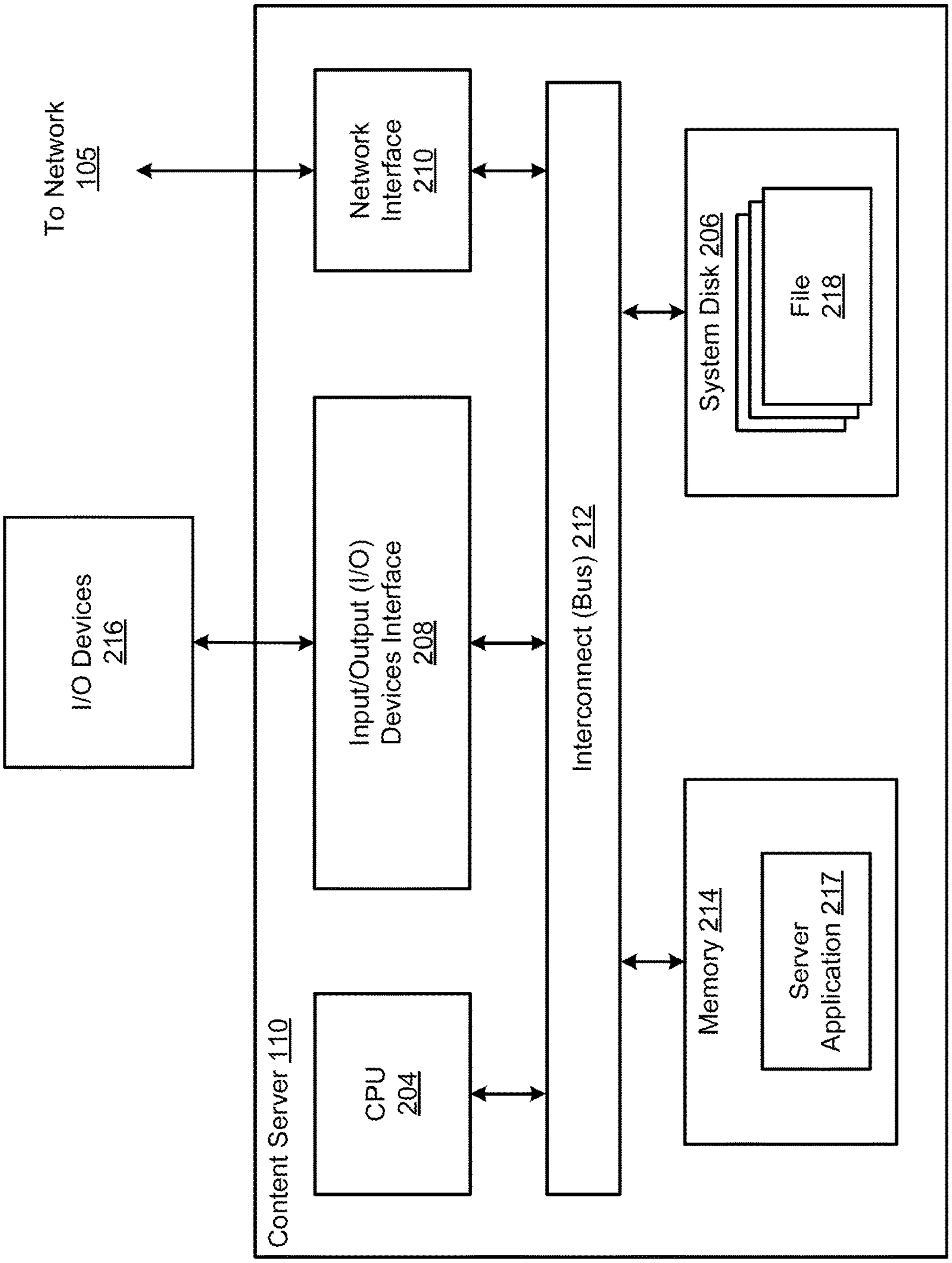
FIG. 2 is a more detailed illustration of the content server of FIG. 1, according to various embodiments.

FIG. 2 is a block diagram of content server 110 that may be implemented in conjunction with the network infrastructure of FIG. 1, according to various embodiments. As shown, content server 110 includes, without limitation, a central processing unit (CPU) 204, a system disk 206, an input/output (I/O) devices interface 208, a network interface 210, an interconnect 212, and a system memory 214.

CPU 204 is configured to retrieve and execute programming instructions, such as a server application 217, stored in system memory 214. Similarly, CPU 204 is configured to store application data (e.g., software libraries) and retrieve application data from system memory 214. Interconnect 212 is configured to facilitate transmission of data, such as programming instructions and application data, between CPU 204, system disk 206, I/O devices interface 208, network interface 210, and system memory 214. I/O devices interface 208 is configured to receive input data from I/O devices 216 and transmit the input data to CPU 204 via interconnect 212. For example, I/O devices 216 may include one or more buttons, a keyboard, a mouse, and/or other input devices. I/O devices interface 208 is further configured to receive output data from CPU 204 via interconnect 212 and transmit the output data to I/O devices 216.

System disk 206 may include one or more hard disk drives, solid state storage devices, or similar storage devices. System disk 206 is configured to store non-volatile data such as files 218 (e.g., audio files, video files, subtitle files, application files, software libraries, etc.). Files 218 can then be retrieved by one or more endpoint devices 115 via network 105. In some embodiments, network interface 210 is configured to operate in compliance with the Ethernet standard.

System memory 214 includes server application 217, which is configured to service requests received from endpoint device 115 and other content servers 110 for one or more files 218. When server application 217 receives a request for a given file 218, server application 217 retrieves the requested file 218 from system disk 206 and transmits file 218 to an endpoint device 115 or a content server 110 via network 105. Files 218 include digital content items such as video files, audio files, and/or still images. In addition, files 218 may include metadata associated with such content items, user/subscriber data, etc. Files 218 that include visual content item metadata and/or user/subscriber data may be employed to facilitate the overall functionality of network infrastructure 100. In alternative embodiments, some or all of files 218 may instead be stored in a control server 120, or in any other technically feasible location within network infrastructure 100.

Figure 3:
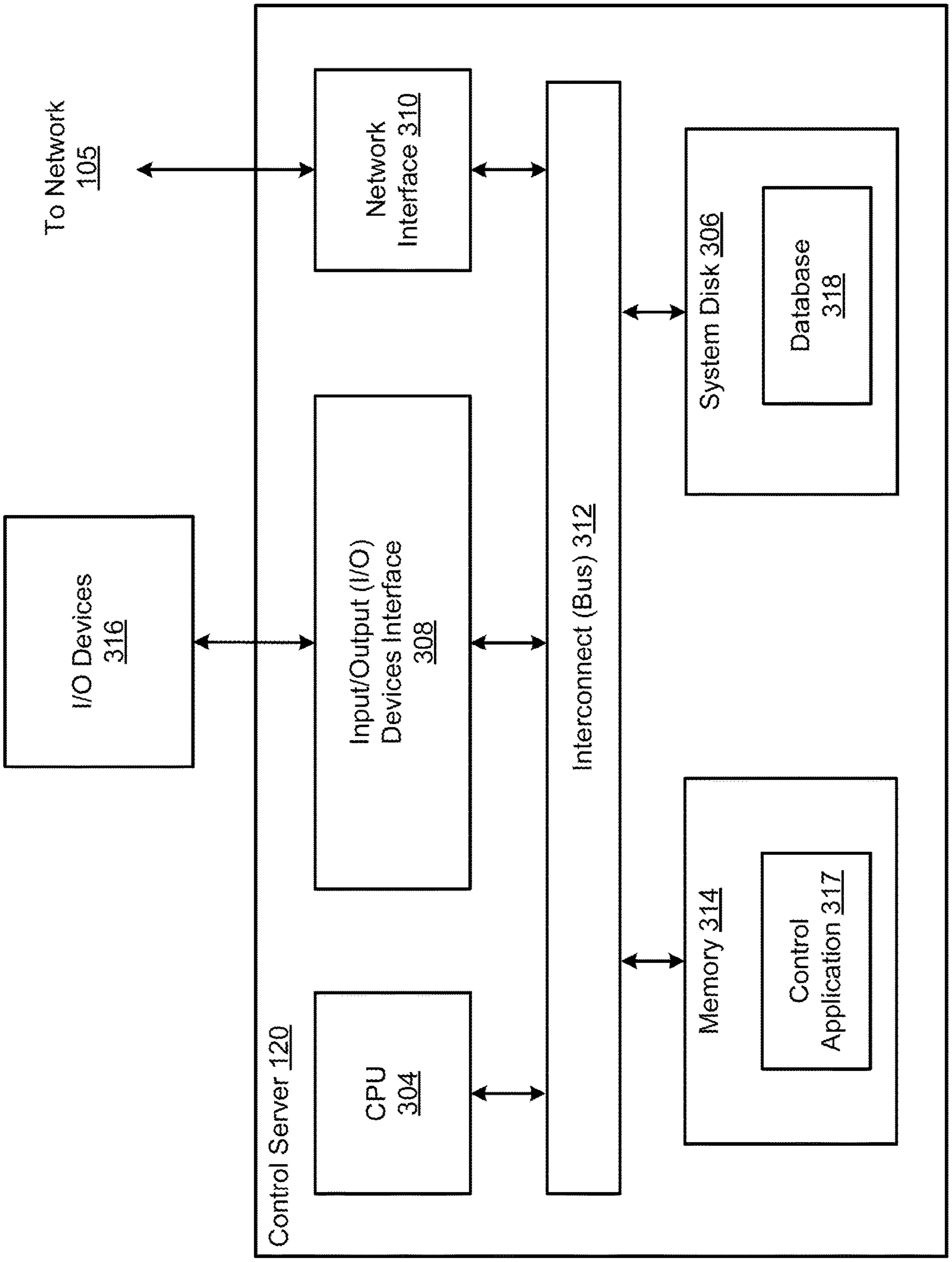
FIG. 3 is a more detailed illustration of the control server of FIG. 1, according to various embodiments.

FIG. 3 is a block diagram of control server 120 that may be implemented in conjunction with the network infrastructure 100 of FIG. 1, according to various embodiments. As shown, control server 120 includes, without limitation, a central processing unit (CPU) 304, a system disk 306, an input/output (I/O) devices interface 308, a network interface 310, an interconnect 312, and a system memory 314.

CPU 304 is configured to retrieve and execute programming instructions, such as control application 317, stored in system memory 314. Similarly, CPU 304 is configured to store application data (e.g., software libraries) and retrieve application data from system memory 314 and a database 318 stored in system disk 306. Interconnect 312 is configured to facilitate transmission of data between CPU 304, system disk 306, I/O devices interface 308, network interface 310, and system memory 314. I/O devices interface 308 is configured to transmit input data and output data between I/O devices 316 and CPU 304 via interconnect 312. System disk 306 may include one or more hard disk drives, solid state storage devices, and the like. System disk 306 is configured to store a database 318 of information associated with content servers 110, cloud services 130, and files 218.

System memory 314 includes a control application 317 configured to access information stored in database 318 and process the information to determine the manner in which specific files 218 will be replicated across content servers 110 included in the network infrastructure 100. Control application 317 may further be configured to receive and analyze performance characteristics associated with one or more of content servers 110 and/or endpoint devices 115. As noted above, in some embodiments, metadata associated with such visual content items, and/or user/subscriber data may be stored in database 318 rather than in files 218 stored in content servers 110.

Figure 4:
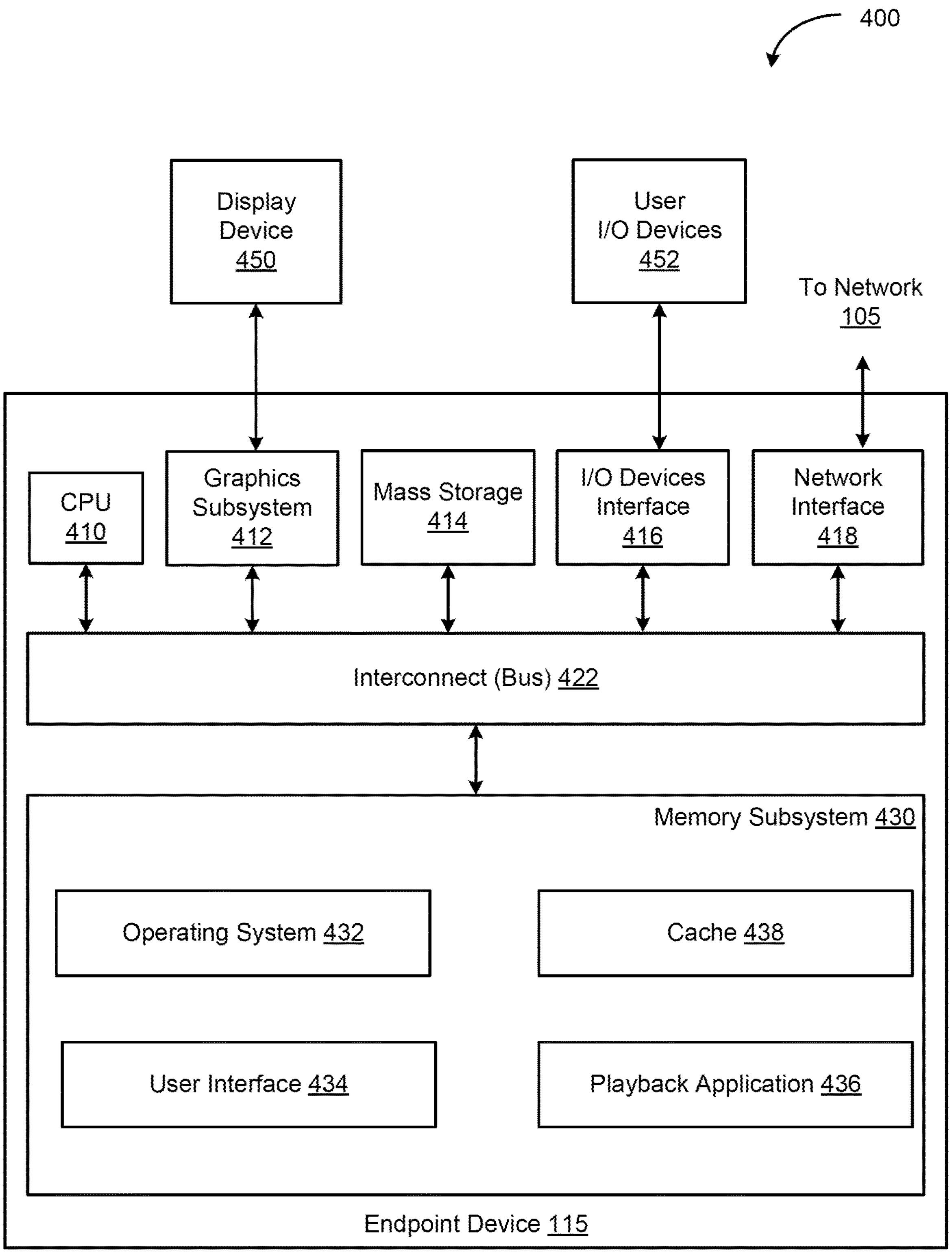
FIG. 4 is a more detailed illustration of the endpoint device of FIG. 1, according to various embodiments.

FIG. 4 is a block diagram of endpoint device 115 that may be implemented in conjunction with the network infrastructure of FIG. 1, according to various embodiments. As shown, endpoint device 115 may include, without limitation, a CPU 410, a graphics subsystem 412, an I/O devices interface 414, a mass storage unit 416, a network interface 418, an interconnect 422, and a memory subsystem 430.

In some embodiments, CPU 410 is configured to retrieve and execute programming instructions stored in memory subsystem 430. Similarly, CPU 410 is configured to store and retrieve application data (e.g., software libraries) residing in memory subsystem 430. Interconnect 422 is configured to facilitate transmission of data, such as programming instructions and application data, between CPU 410, graphics subsystem 412, I/O devices interface 414, mass storage unit 416, network interface 418, and memory subsystem 430.

In some embodiments, graphics subsystem 412 is configured to generate frames of video data and transmit the frames of video data to display device 450. In some embodiments, graphics subsystem 412 may be integrated into an integrated circuit, along with CPU 410. Display device 450 may comprise any technically feasible means for generating an image for display. For example, display device 450 may be fabricated using liquid crystal display (LCD) technology, cathode-ray technology, and light-emitting diode (LED) display technology. I/O devices interface 414 is configured to receive input data from user I/O devices 452 and transmit the input data to CPU 410 via interconnect 422. For example, user I/O devices 452 may include one or more buttons, a keyboard, and/or a mouse or other pointing device. I/O devices interface 414 also includes an audio output unit configured to generate an electrical audio output signal. User I/O devices 452 includes a speaker configured to generate an acoustic output in response to the electrical audio output signal. In alternative embodiments, display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. Network interface 418 is configured to transmit and receive packets of data via network 105. In some embodiments, network interface 418 is configured to communicate using the well-known Ethernet standard. Network interface 418 is coupled to CPU 410 via interconnect 422.

In some embodiments, memory subsystem 430 includes programming instructions and application data that include an operating system 432, a user interface 434, a playback application 436, and a platform player 438. Operating system 432 performs system management functions such as managing hardware devices including network interface 418, mass storage unit 416, I/O devices interface 414, and graphics subsystem 412. Operating system 432 also provides process and memory management models for user interface 434, playback application 436, and/or platform player 438. User interface 434, such as a window and object metaphor, provides a mechanism for user interaction with endpoint device 115. Persons skilled in the art will recognize the various operating systems and user interfaces that are well-known in the art and suitable for incorporation into endpoint device 115.

In some embodiments, playback application 436 is configured to request and receive content from content server 110 via network interface 418. Further, playback application 436 is configured to interpret the content and present the content via display device 450 and/or user I/O devices 452. In so doing, playback application 436 may generate frames of video data based on the received content and then transmit those frames of video data to platform player 438. In response, platform player 438 causes display device 450 to output the frames of video data for playback of the content on endpoint device 115. In one embodiment, platform player 438 is included in operating system 432.

Cloud-Based Video Processing

Figure 5:
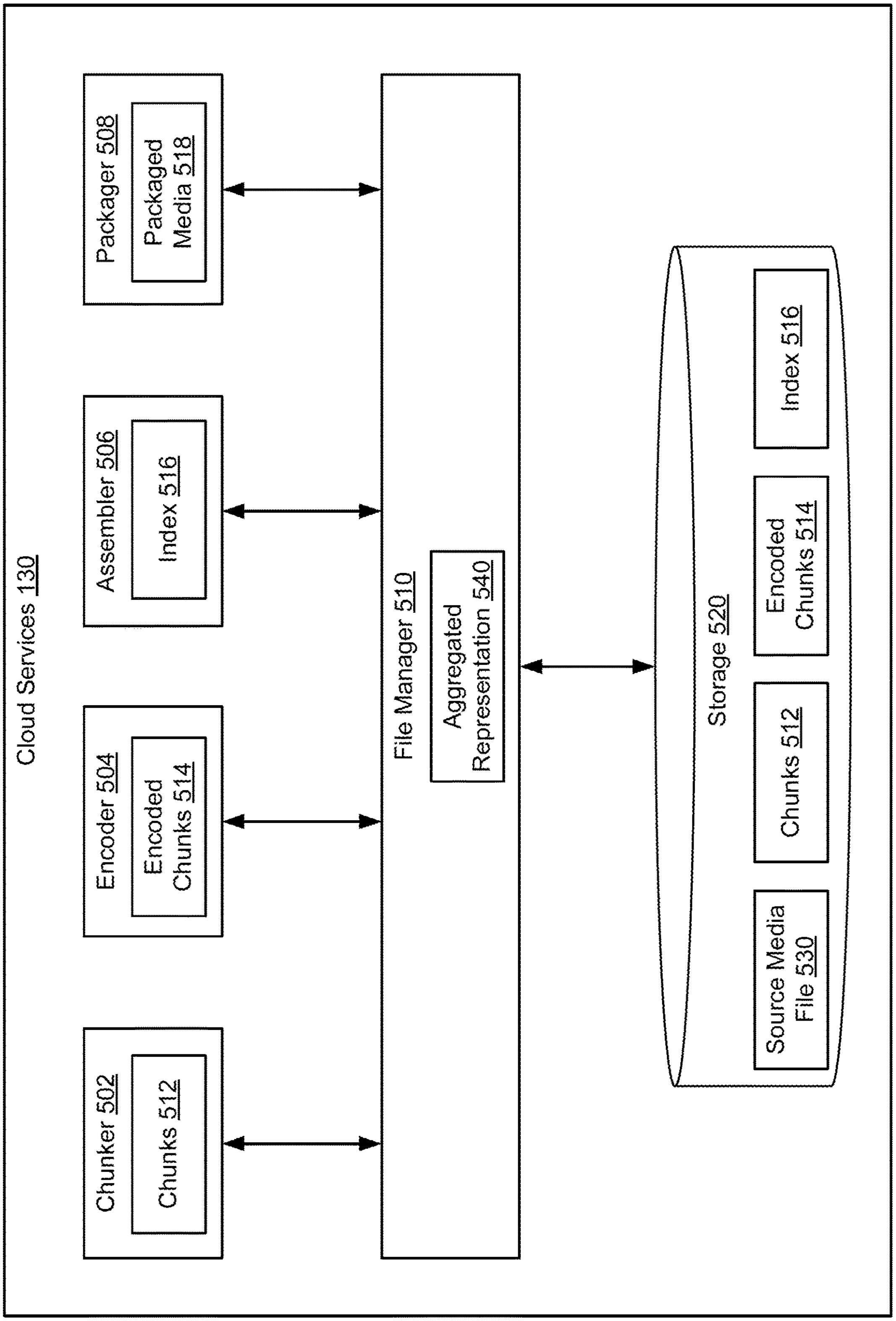
FIG. 5 is a more detailed illustration of the cloud services of FIG. 1, according to various embodiments.

FIG. 5 is a block diagram of one or more video processing pipeline applications included in cloud services 130 of FIG. 1, according to various embodiments. As shown, cloud services 130 includes, without limitation, chunker 502, encoder 504, assembler 506, packager 508, and file manager 510. Any number of instances of each of chunker 502, encoder 504, assembler 506, packager 508, and file manager 510 can execute on any number of computing instances (not shown) of a cloud computing system or other distributed computing environment.

Additionally, cloud services 130 includes and/or has access to storage 520. Storage 520 can include any number and/or types of storage devices that are accessible to the applications and/or services included in cloud services 130, such as chunker 502, assembler 506, packager 508, and file manager 510. In some embodiments, storage 520 is provided by one or more cloud-based storage services. Storage 520 stores data used and/or generated by the other applications and/or services of cloud services 130. As shown, storage 520 stores source media file 530, chunks 512, encoded chunks 514, and index 516.

As shown in FIG. 5, file manager 510 is configured to manage the access and processing of data stored in storage 520. For example, file manager 510 manages uploading data to and downloading data from storage 520 on behalf of applications such as chunker 502, encoder 504, assembler 506, and packager 508. File manager 510 retrieves requested data from storage 520 and transmits the requested data to the requesting application, and receives data from an application and uploads the data to storage 520.

In some embodiments, file manager 510 is a handler application that executes on the same computing instance as other applications of cloud services 130. If an application requests data that is stored in storage 520, file manager 510 retrieves the data from storage 520. In various embodiments, file manager 510 can mount the retrieved data as one or more files in the local file system of the computing instance. In some embodiments, file manager 510 mounts multiple portions of an object as separate files. For example, file manager 510 could mount each chunk 512 or encoded chunk 514 as a separate file such that an application (e.g., chunker 502, encoder 504, assembler 506, or packager 508) recognizes each chunk 512 or encoded chunk 514 as a file.

In some embodiments, file manager 510 mounts one or more portions of an object as a single file that represents the entire object. For example, as discussed in further detail below, file manager 510 could mount one or more encoded chunks 514 as a single file such that an application perceives the one or more encoded chunks 514 as a single encoded media file. The one or more encoded chunks 514 do not need to include all encoded chunks that correspond to the encoded version of the source media file 530.

In some embodiments, chunker 502 is configured to receive a media file and divide the media file into multiple discrete portions or chunks. As shown in FIG. 5, file manager 510 retrieves a source media file 530 from storage 520 and transmits the source media file 530 to chunker 502. Chunker 502 receives the source media file 530 and divides source media file 530 into chunks 512. In various embodiments, chunker 502 may use any technically feasible technique for dividing a file or media file into discrete portions to generate chunks 512. For example, chunker 502 could determine a number of frames included in source media file 530, and divide source media file 530 into chunks 512 such that each chunk includes the same or similar number of frames as the other chunks. As another example, chunker 502 could identify a number of scenes included in source media file 530, and divide source media file 530 into chunks 512 such that each chunk corresponds to a different scene. In some embodiments, after generating chunks 512, chunker 502 uploads the chunks 512 to storage 520. As shown in FIG. 5, to upload the chunks 512 to storage 520, chunker 502 transmits the chunks 512 to file manager 510, and file manager 510 stores the chunks to storage 520. In other embodiments, chunker 502 transmits the chunks 512 to one or more instances of encoder 504 executing on one or more different computing instances.

In some embodiments, encoder 504 is configured to perform one or more encoding operations on a media file, such as source media file 530 or a chunk 512, to generate an encoded media file. As shown in FIG. 5, file manager 510 retrieves chunks 512 from storage 520 and transmits the chunks 512 to encoder 504. Although a single instance of encoder 504 is shown in FIG. 5, file manager 510 can transmit any number of chunks included in chunks 512 to any number of instances of encoder 504 executing on any number of computing instances. For example, each instance of encoder 504 could receive a different subset of chunks included in chunks 512.

Encoder 504 receives the chunks 512 and performs one or more encoding operations on each chunk 512 to generate a corresponding encoded chunk 514. Encoder 504 can encode the chunks 512 using any technically feasible encoding operation(s). In some embodiments, encoder 504 encodes a set of chunks 512 using a number of different encoding configurations to generate multiple sets of encoded chunks 514. For example, encoder 504 could encode chunks 512 using a first encoding configuration to generate a first set of encoded chunks 514 and using a second encoding configuration to generate a second set of encoded chunks 514. Each set of encoded chunks 514 is a different encoding of the source media file 530. In some embodiments, after generating encoded chunks 514, encoder 504 uploads the encoded chunks 514 to storage 520. As shown in FIG. 5, to upload the encoded chunks 514 to storage 520, encoder 504 transmits the encoded chunks 514 to file manager 510, and file manager 510 stores the encoded chunks to storage 520. In other embodiments, encoder 504 transmits the encoded chunks 514 to one or more instances of assembler 506 executing on one or more computing instances.

As discussed above, an assembler typically combines the encoded chunks 514 into a single encoded media file, referred to herein as physical assembly of the encoded chunks 514. However, when physically assembling the encoded chunks 514 into a single encoded media file, the assembler has to receive or retrieve the encoded chunks 514 from storage 520, process the encoded chunks 514 to generate the encoded media file, and upload the encoded media file to storage 520. To prepare the encoded media file for streaming to a client device or video editing application, a packager then has to download the encoded media file from storage 520. Accordingly, downloading the encoded chunks 514, uploading the encoded media file, and subsequently downloading the encoded media file utilize a large amount of network resources.

Virtual and Index File Assembly

To address the above problems, cloud services 130 includes an assembler 506 that is configured to perform index assembly rather than, or in addition to, physical assembly. As referred to herein, index assembly refers to combining metadata associated with the encoded chunks 514 to generate an index 516 that corresponds to the encoded media file that would have been generated by physically assembling the encoded chunks 514. The index file can be used by other applications, such as packager 508 or file manager 510, to identify and retrieve the encoded chunks 514 for a given media title or source media file. In some embodiments, the packager 508 is configured to perform virtual assembly of the one or more encoded chunks 514 to generate packaged media 518. As referred to herein, virtual assembly refers to assembling and packaging a set of encoded chunks 514 in a single pass, rather than combining or concatenating the set of encoded chunks 514 prior to packaging. For example, the packager 508 could be configured to retrieve one or more encoded chunks 514, process the one or more encoded chunks included in the set of encoded chunks 514 to generate a portion of output, and then repeat the retrieval and processing until all the encoded chunks in the set of encoded chunks 514 have been processed. In some embodiments, an application such as file manager 510 is configured to handle downloading of the set of encoded chunks 514. The application generates a representation of the set of encoded chunks 514 that is perceived by another application, such as the packager 508, as a single encoded media file without first combining or concatenating the set of encoded chunks 514.

In some embodiments, the index 516 is an index file that indicates, for each encoded chunk 514, a location of the encoded chunk 514 in storage 520. Additionally, each encoded chunk 514 corresponds to a plurality of frames included in the source media file 530. The index indicates, for each frame of the plurality of frames, a location of the corresponding encoded frame within the encoded chunk 514, such as an offset associated with the frame and a size of the data corresponding to the frame. In some embodiments, if the encoded chunk 514 includes a header, the index indicates a location of the header within the encoded chunk 514, such as an offset associated with the header and a size of the data corresponding to the header. In some embodiments, the plurality of frames of encoded chunk 514 are organized into multiple groups of pictures. Each group of pictures includes a subset of the plurality of frames that have to be decoded together, i.e., as a group. The index 516 indicates an order of the multiple groups of pictures and, for each group of pictures, a number of frames included in the group of pictures, which frames are included in the group of picture, and an order associated with the one or more frames.

In some embodiments, to generate the index 516, assembler 506 identifies, for a given source media file 530, a set of encoded chunks 514 corresponding to the given source media file 530. Assembler 506 determines the location of each encoded chunk included in the set of encoded chunks 514. Assembler 506 generates an index 516 that indicates that location of each encoded chunk. In some embodiments, the index 516 corresponds to a specific encoding of the source media file 530. Assembler 506 could identify the set of encoded chunks 514 that corresponds to the specific encoding of the source media file 530 from multiple sets of encoded chunks 514, where each set of encoded chunks 514 corresponds to a different encoding of the source media file 530. The index 516 could indicate the specific encoding and/or be stored in association with the specific encoding. For example, the index 516 could have a file name that is indicative of the specific encoding. As another example, the index 516 could be stored in a database in storage 520 that associates the index 516 with the specific encoding. In some embodiments, the index 516 corresponds to multiple encodings of the source media file 530. For example, the index 516 could indicate the location of each set of encoded chunks 514 that corresponds to the source media file 530. Additionally, the index 516 could indicate the encoding information for each set of encoded chunks 514.

In various embodiments, assembler 506 requests, receives and/or generates location information for each encoded chunk 514. The location information includes, for example, the location of frames included in the encoded chunk 514, a header included in the encoded chunk 514, and/or one or more groups of pictures included in the encoded chunk 514. Assembler 506 generates an index 516 that includes the location information associated with each encoded chunk 514. Additionally, assembler 506 could generate information that indicates an order of the encoded chunks 514 and/or organize the location information for the encoded chunks 514 according to the order of the encoded chunks 514.

In some embodiments, the location information for each encoded chunk 514 includes an index corresponding to the encoded chunk 514. The index indicates, for example, the location of one or more frames included in the encoded chunk 514, the size of each frame, the location of a header of the encoded chunk 514, the size of the header of the encoded chunk 514, one or more groups of pictures included in the encoded chunk 514, and/or one or more frames included in each group of pictures. In some embodiments, another application or service generates an index for an encoded chunk 514 and assembler 506 retrieves the index from storage 520, receives the index from the application or service, and/or requests the index from file manager 510. In some embodiments, assembler 506 receives the encoded chunk 514 and generates an index based on the encoded chunk 514.

In some embodiments, after generating an encoded chunk 514 or in conjunction with generating the encoded chunk 514, encoder 504 generates an index corresponding to the encoded chunk 514. In some embodiments, to generate the index for an encoded chunk 514, encoder 504 determines a set of frames that included in the encoded chunk 514 and, for each frame, a location of the frame within the encoded chunk 514 (e.g., the offset amount). Encoder 504 determines whether the encoded chunk 514 includes a header. If the encoded chunk 514 includes a header, encoder 504 determines a location and/or a size of the header. Additionally, encoder 504 determines whether the encoded chunk 514 includes one or more groups of pictures. If the encoded chunk 514 includes one or more groups of pictures, encoder 504 determines the frames included in each group of picture.

In some embodiments, encoder 504 is configured to determine a structure corresponding to the encoded chunk 514 based on a media file format of the encoded chunk 514, such as AVC, HEVC, VP9, AV1, PRORES, MPG2, MPG4, and the like. The specific elements included in an encoded chunk 514 and/or the organization of the included elements within the encoded chunk 514 may vary depending on the given file format. For example, a first file format could include a header while another file format does not include a header. As another example, a third file format could include groups of pictures while a fourth file format does not include groups of pictures. Encoder 504 is configured to determine, based on the file format of the encoded chunk 514, what type of information is included in the encoded chunk 514 and how to extract the information. For example, encoder 504 could determine that an encoded chunk 514 is in a file format that includes a header at the beginning of the file (e.g., offset 0) and that, for that file format, the header includes metadata indicating the locations of one or more sets of encoded frames. In response, encoder 504 determines that the encoded chunk 514 includes a header at offset 0, and then determines the location of the frames included in encoded chunk 514 based on the locations indicated in the header. As another example, encoder 504 could determine that an encoded chunk 514 is in a file format that does not include any structural information. In response, encoder 504 parses or otherwise analyzes the data contained in the encoded chunk 514 to identify each frame included in the encoded chunk 514 and the location within the data corresponding to the frame. Encoder 504 may use any technically feasible techniques for identifying and extracting information from an encoded chunk 514. The particular technique used to identify and extract information from the encoded chunk 514 can also vary depending on the file format of the encoded chunk 514.

Based on the information extracted from the encoded chunk 514, encoder 504 generates an index that indicates the frames included in set of frames, the order of the frames, the locations of the frames, and the sizes of the frames. If the encoded chunk 514 includes a header, the index further includes the location of the header and/or the size of the header. If the encoded chunk 514 includes one or more groups of pictures, the index further the one or more groups of pictures, the order of the one or more groups of pictures, and the frames included in each group of pictures. Additionally, the index could include other metadata associated with the encoded chunk 514, header, the set of frames, and/or the group(s) of pictures. For example, the index could include metadata that indicates an identifier or sequence number associated with the encoded chunk 514. As another example, the index could indicate a frame number associated with each frame.

Figure 6:
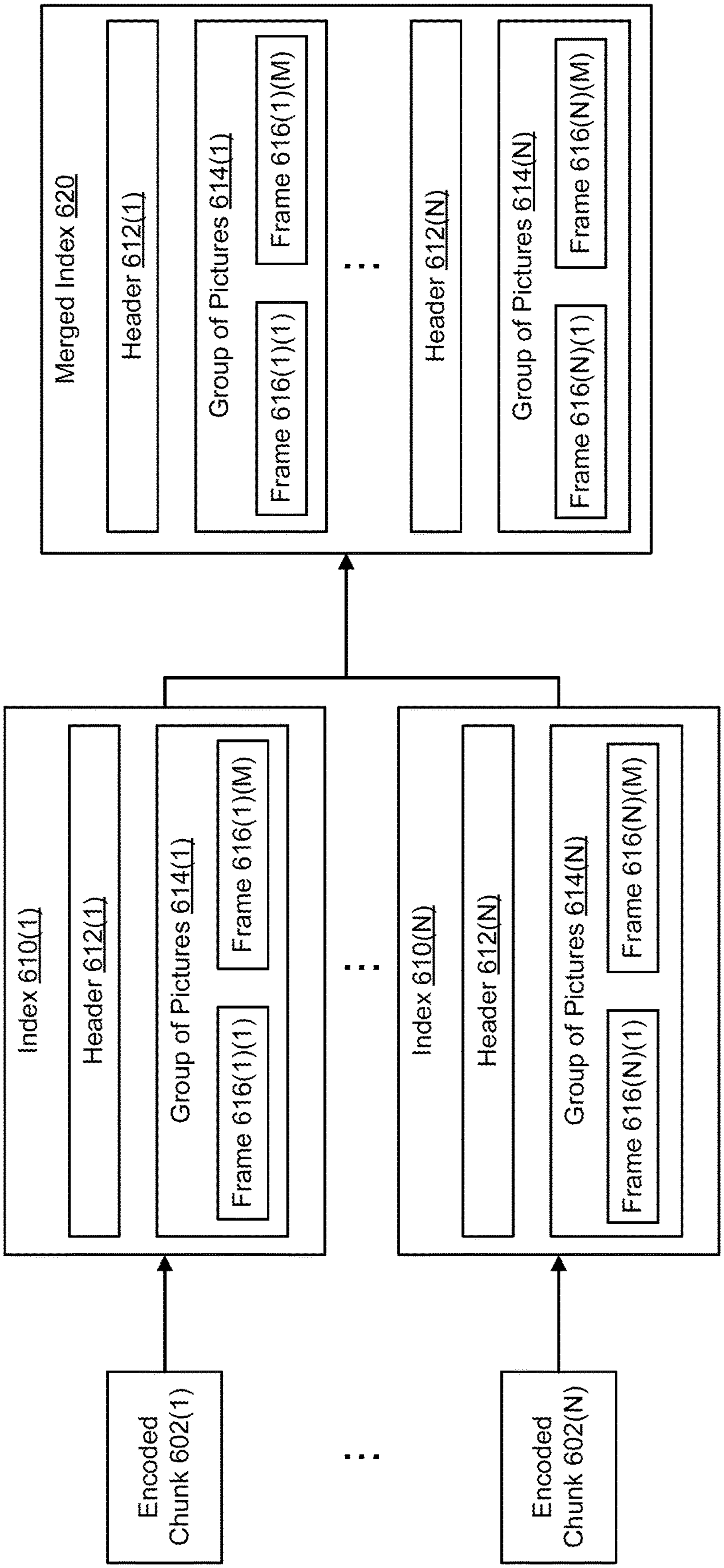
FIG. 6 illustrates exemplar indices corresponding to an encoded media file, according to various embodiments.

FIG. 6 illustrates exemplar indices corresponding to an encoded media file, according to various embodiments. As shown in FIG. 6, a set of indices 610(1)-610(N) correspond to a set of encoded chunks 602(1)-602(N). Each index 610(*x*), for an integer x from 1 to N includes, without limitation, header 612(*x*), group of pictures 614(*x*), and frames 616(*x*)(1)-616(*x*)(M). In other embodiments, each index 610(*x*) could include more or fewer elements than illustrated in FIG. 6. For example, for some file formats of encoded chunks 602(1)-602(N), the corresponding indices 610(1)-610(N) do not include a header 612(1)-612(N). As another example, each index 610(*x*) could include a different number of group of pictures, or may not include any group of pictures, and/or each group of picture could include a different number of frames.

In some embodiments, header 612(*x*) indicates location information associated with a header of the corresponding encoded chunk 602(*x*), such as an offset value associated with the header and a size of the header. Additionally, header 612(*x*) could include other metadata associated with the header and/or the encoded chunk 602, such as a location of the encoded chunk 602 in storage 520 (e.g., a uniform resource indicator).

In some embodiments, group of pictures 614(*x*) indicates location information associated with a group of pictures included in the corresponding encoded chunk 602(*x*), such as an offset value associated with the group of pictures and a size of the group of pictures. In some embodiments, group of pictures 614(*x*) indicates structural information associated with the group of pictures, such as a number of frames included in the group of pictures, identifier(s) corresponding to one or more frames included in the group of pictures, an order of the frames included in the group of pictures, and the like.

In some embodiments, each frame included in frames 616(*x*)(1)-616(*x*)(M) indicates location information associated with the corresponding frame included in the encoded chunk 602(*x*), such as an offset value associated with the corresponding frame and a size of the corresponding frame. Additionally, each frame included in frames 616(*x*)(1)-616(*x*)(M) could include other metadata associated with the corresponding frame such as a sequence number or other identifier for the corresponding frame.

In some embodiments, after generating the index, encoder 504 uploads the index to storage 520. Assembler 506 receives or retrieves the index from storage 520 when generating the index 516. In other embodiments, encoder 504 transmits the index to one or more instances of assembler 506 executing on one or more computing instances. In other embodiments, assembler 506 receives or retrieves the encoded chunks 514 and generates, for each encoded chunk 514, the index corresponding to the encoded chunk. Assembler 506 generates an index 516 that includes the information included in the index corresponding to each encoded chunk 514.

In some embodiments, assembler 506 receives or retrieves the encoded chunks 514 and extracts location information from each encoded chunk. Assembler 506 generates an index 516 that includes the extracted location information. Extracting location information from an encoded chunk and/or generating an index corresponding to the encoded chunk is performed in a manner similar to that discussed above with respect to encoder 504.

Referring to FIG. 6, assembler 506 determines that a given encoded version of a source media file corresponds to encoded chunks 602(1)-602(N). Assembler 506 receives and/or generates indices 610(1)-610(N) corresponding to encoded chunks 602(1)-602(N). Assembler 506 combines the data included in indices 610(1)-601(N) to generate a merged index 620. As shown in FIG. 6, merged index 620 includes headers 612(1)-(N), groups of pictures 614(1)-(N), and the corresponding frames 616(1)(1)-616(N)(M). Although FIG. 6 illustrates the location information included in merged index 620 in an order based on the order of indices 610(1)-(N), the location information included in merged index 620 could be organized and/or grouped in any number of ways.

In some embodiments, packager 508 is configured to receive one or more encoded chunks and package the one or more encoded chunks to generate a packaged media file. Packager 508 requests the index 516 corresponding to source media file 530 from file manager 510, receives the index 516 from assembler 506, and/or retrieves the index 516 from storage 520. Packager 508 determines, based on the index 516, the locations of one or more encoded chunks 514 corresponding to the source media file 530. Packager 508 retrieves the one or more encoded chunks 514 from storage 520, or requests the one or more encoded chunks 514 from file manager 510, based on the determined locations of the one or more encoded chunks 514. For example, packager 508 could send a request to file manager 510 to retrieve the files at the determined locations. Packager 508 receives the one or more encoded chunks 514 and performs one or more packaging operations to package the one or more encoded chunks 514 into packaged media 518. The one or more packaging operations could include, for example, multiplexing audio and video, adding digital rights management (DRM) protection, adding container layer information, adding system layer information, and the like.

In some embodiments, packager 508 is configured to receive an encoded media file and package the encoded media file to generate the packaged media file. Packager 508 sends a request to file manager 510 for an encoded media file corresponding to source media file 530. File manager 510 determines whether the encoded media file has been physically assembled or index assembled, for example, by determining whether a physical file or an index file is stored in storage 520. If a physical file corresponding to the encoded media file is stored in storage 520, then file manager 510 retrieves the physical file and transmits the physical file to packager 508.

If an index file corresponding to the encoded media file is stored in storage 520, then file manager 510 retrieves the index file and determines the locations of one or more encoded chunks 514 corresponding to the encoded media file. File manager 510 retrieves the one or more encoded chunks 514 from storage 520 based on the determined locations and generates an aggregated representation 540 of the encoded media file that includes the one or more encoded chunks 514. In some embodiments, the aggregated representation 540 is a set of files, where each file corresponds to a different encoded chunk included in the one or more encoded chunks 514. In some embodiments, the aggregated representation 540 is a single file that includes the one or more encoded chunks 514. Packager 508 receives the aggregated representation 540 a set of one or more files and packages the aggregated representation 540 similar to packaging an entire encoded media file.

In some embodiments, an instance of file manager 510 executes on the same computing instance as packager 508. Generating and transmitting an aggregated representation 540 based on one or more encoded chunks 514 includes mounting the one or more chunks 514 as one or more files in the local file system of the computing instance. Packager 508 accesses the one or more files from the local file system of the computing instance.

Figure 7A:
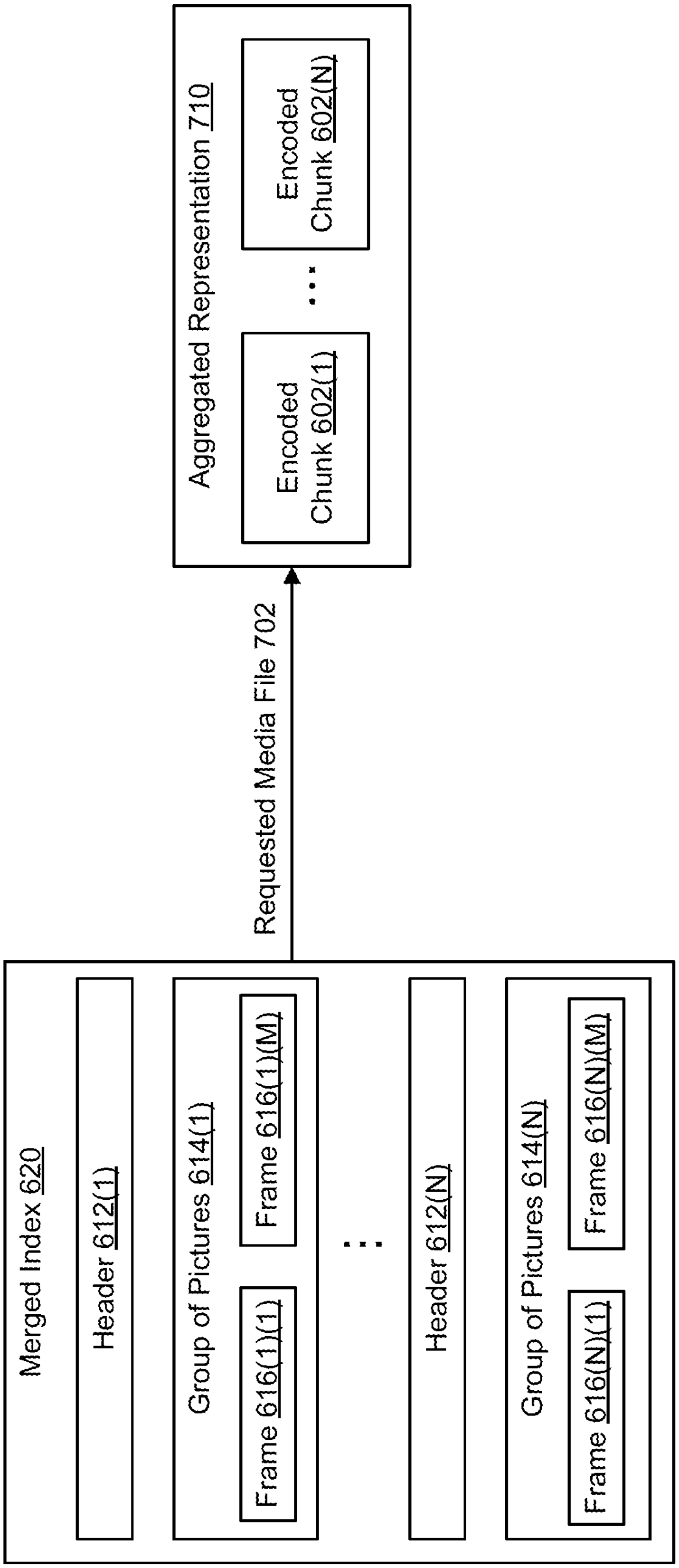
FIG. 7A illustrates an exemplar aggregated representation corresponding to an encoded media file, according to various embodiments.

FIG. 7A illustrates an exemplar aggregated representation 710 generated based on the merged index 620 of FIG. 6, according to various embodiments. As shown in FIG. 7A, aggregated representation 710 is generated in response to a request 702 for an encoded media file. Based on the location information indicated in merged index 620, file manager 510 determines which encoded chunks correspond to the encoded media file and the locations of the encoded chunks. File manager 510 retrieves encoded chunks 602(1)-602(N) from storage 520 and generates an aggregated representation 710 that includes the encoded chunks 602(1)-602(N). The aggregated representation 710 is provided to packager 508 as if it were the requested encoded media file. The packager 508 can subsequently process and package aggregated representation 710 to generate a packaged media 518.

In some embodiments, packager 508 requests one or more specific encoded chunks 514 included in encoded chunks 514. File manager 510 determines the locations of the one or more specific encoded chunks 514 and retrieves the one or more specific encoded chunks 514. File manager 510 generates an aggregated representation 540 that includes the one or more specific encoded chunks 514.

In some embodiments, packager 508 requests a specific portion of the encoded media file, such as a range of frames included in the encoded media file. File manager 510 determines, based on the index 516, one or more encoded chunks 514 corresponding to the requested portion of the encoded media file. For example, if packager 508 requests a range of frames, file manager 510 determines which encoded chunks 514 contain frames that are included in the range of frames. File manager 510 determines, based on the index 516, the location of each encoded chunk 514 that corresponds to the requested portion of the encoded media file and retrieves the encoded chunk 514 from storage 520. File manager 510 generates an aggregated representation 540 that includes the one or more encoded chunks 514.

In some embodiments, file manager 510 identifies one or more portions of each encoded chunk 514 that corresponds to the requested portion of the encoded media file, and selects the one or more portions for inclusion in the aggregated representation 540. For example, if the requested portion of the encoded media file only includes a subset of the frames included in an encoded chunk 514, file manager 510 could extract the subset of frames from the encoded chunk 514. Additionally or alternately, in some embodiments, file manager 510 does not include one or more portions of an encoded chunk 514 that do not correspond to the requested portion or removes the one or more portions from the aggregated representation 540. For example, file manager 510 could identify a group of pictures included in an encoded chunk 514 that includes frames corresponding to a requested range of frames. However, the group of pictures could also include one or more frames that are not included in the requested range of frames. File manager 510 could trim the one or more frames that are not included in the requested range of frames when generating the aggregated representation 540.

Figure 7B:
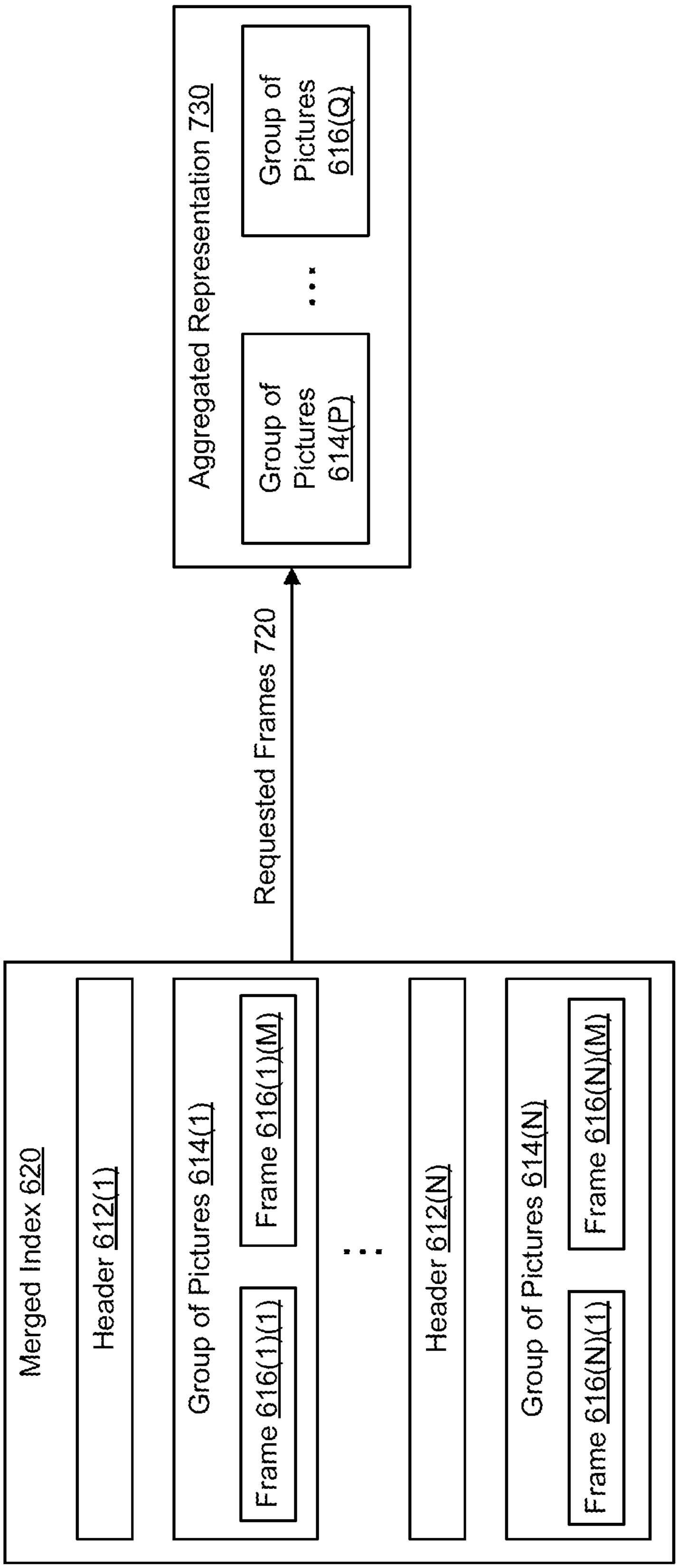
FIG. 7B illustrates another exemplar aggregated representation corresponding to an encoded media file, according to other various embodiments.

FIG. 7B illustrates another exemplar aggregated representation 730 generated based on the merged index 620 of FIG. 6, according to various embodiments. As shown in FIG. 7B, aggregated representation 730 is generated in response to a request 720 for one or more frames of an encoded media file. Based on the location information indicated in merged index 620, file manager 510 determines which encoded chunks correspond to the requested frames of the encoded media file and the locations of the encoded chunks. File manager 510 retrieves the one or more encoded chunks from storage 520. Additionally, based on the location information indicated in merged index 620, file manager 510 determines that groups of pictures 614(P)-614(Q) include the requested frames of the encoded media file and extracts the groups of pictures 614(P)-614(Q) from the one or more encoded chunks. File manager 510 generates an aggregated representation 730 that includes the groups of pictures 614(P)-614(Q). The aggregated representation 730 is provided to packager 508 as if it were an encoded media file. The packager 508 can subsequently process and package aggregated representation 730 to generate a packaged media 518.

One benefit of the file manager 510 generating an aggregated representation 540 and transmitting the aggregated representation 540 to packager 508, is that the packager 508 does not have to distinguish between physically assembled and index assembled media files. Because the packager 508 perceives the aggregated representation 540 as an encoded media file, the packager 508 can package the aggregated representation 540 in a manner similar to a physical encoded media file. The packager 508 does not have to be re-configured to utilize index 516 or to operate differently when packaging index assembled media files. Furthermore, the packager 508 does not need to manage the download of multiple different files or file portions, e.g., the index and the different encoded chunks.

Figure 8:
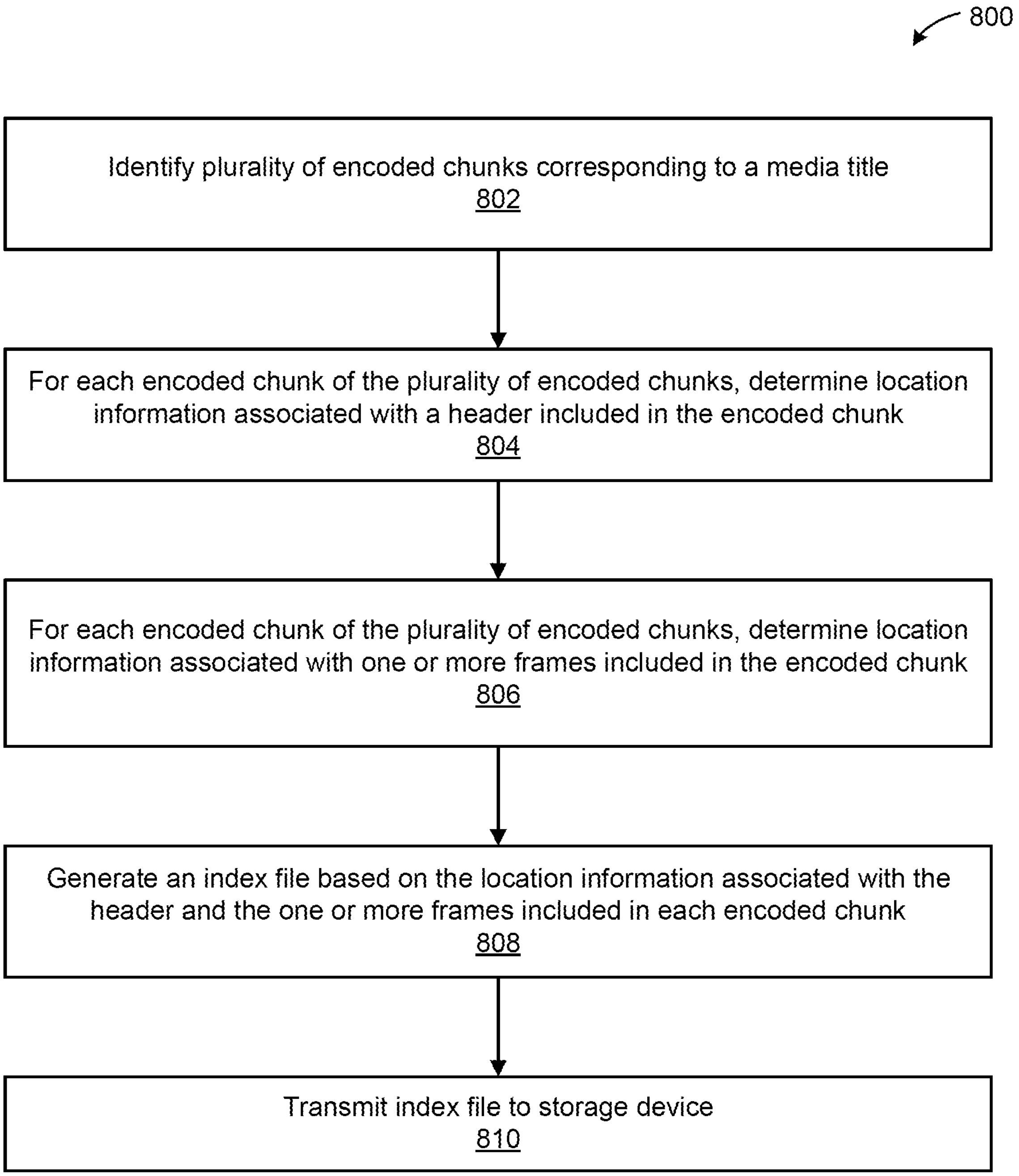
FIG. 8 is a flowchart of method steps for generating an index corresponding to an encoded media file, according to various embodiments.

FIG. 8 is a flowchart of method steps for generating an index corresponding to an encoded media file, according to various embodiments. Although the method steps are described with reference to the systems of FIGS. 1-5, persons skilled in the art will understand that any system configured to implement the method steps, in any order, falls within the scope of the present invention.

As shown in FIG. 8, a method 800 begins at step 802, where assembler 506 identifies a plurality of encoded chunks 514 corresponding to a media title. In some embodiments, assembler 506 identifies the plurality of encoded chunks 514 based on identifying, in storage 520, a plurality of file portions corresponding to an encoded version of the media title. For example, the encoded chunks 514 could be stored as "title1.264", "title2.264", "title3.264," and so forth.

If the encoded chunks do not include headers, then the method proceeds to step 806. If the encoded chunks include headers, then at step 804, assembler 506 determines, for each encoded chunk included in the plurality of encoded chunks 514, location information associated with a header included in the encoded chunk. The location information includes, for example, an offset value corresponding to the header and a size, within the encoded chunk, of the header.

At step 806, assembler 506 determines, for each encoded chunk included in the plurality of encoded chunks 514, location information associated with one or more frames included in the encoded chunk. The location information includes, for example, an offset value corresponding to each frame and a size, within the encoded chunk, of the frame.

In some embodiments, determining location information associated with the one or more frames included in an encoded chunk 514 includes retrieving or receiving an index corresponding to the encoded chunk 514. Assembler 506 identifies the one or more frames included in the encoded chunk 514 and the location information for each frame based on the information included in the index.

In some embodiments, determining location information associated with the one or more frames included in an encoded chunk 514 includes retrieving or receiving the encoded chunk 514 and analyzing the encoded chunk 514 to determine the location of each frame within the encoded chunk 514. For example, assembler 506 could determine the location of a frame based on information included in a header of the encoded chunk 514. As another example, assembler 506 could determine the location of each frame by reading the data contained in encoded chunk 514.

In some embodiments, determining location information associated with the one or more frames included in an encoded chunk 514 includes identifying one or more groups of pictures included in the encoded chunk 514. Each group of picture includes a subset of the frames included in the encoded chunk 514. Assembler 506 determines, for each group of pictures, the subset of frames included in the group of pictures. Additionally, in some embodiments, assembler 506 could determine, for each group of pictures, location information associated with the group of pictures. The location information could include, for example, an offset value corresponding to the group of pictures and a size, within the encoded chunk, of the group of pictures.

At step 808, assembler 506 generates an index 516 based on the location information associated with the one or more frames included in each encoded chunk and, optionally, the location information associated with the header included in each encoded chunk. The index 516 indicates the locations of each encoded chunk and the locations of the elements included in each encoded chunk. In some embodiments, assembler 506 generates the index 516 by merging the information contained in one or more index files corresponding to the one or more encoded chunks 514. The index 516 represents the encoded media file that would be formed if the one or more encoded chunks 514 were physically assembled into a single file.

At step 810, assembler 506 transmits the index 516 to a storage device, such as storage 520. In some embodiments, storage 520 associates the index 516 with the encoded media file. When an application requests the encoded media file, the index 516 is instead identified and retrieved from storage 520.

Figure 9:
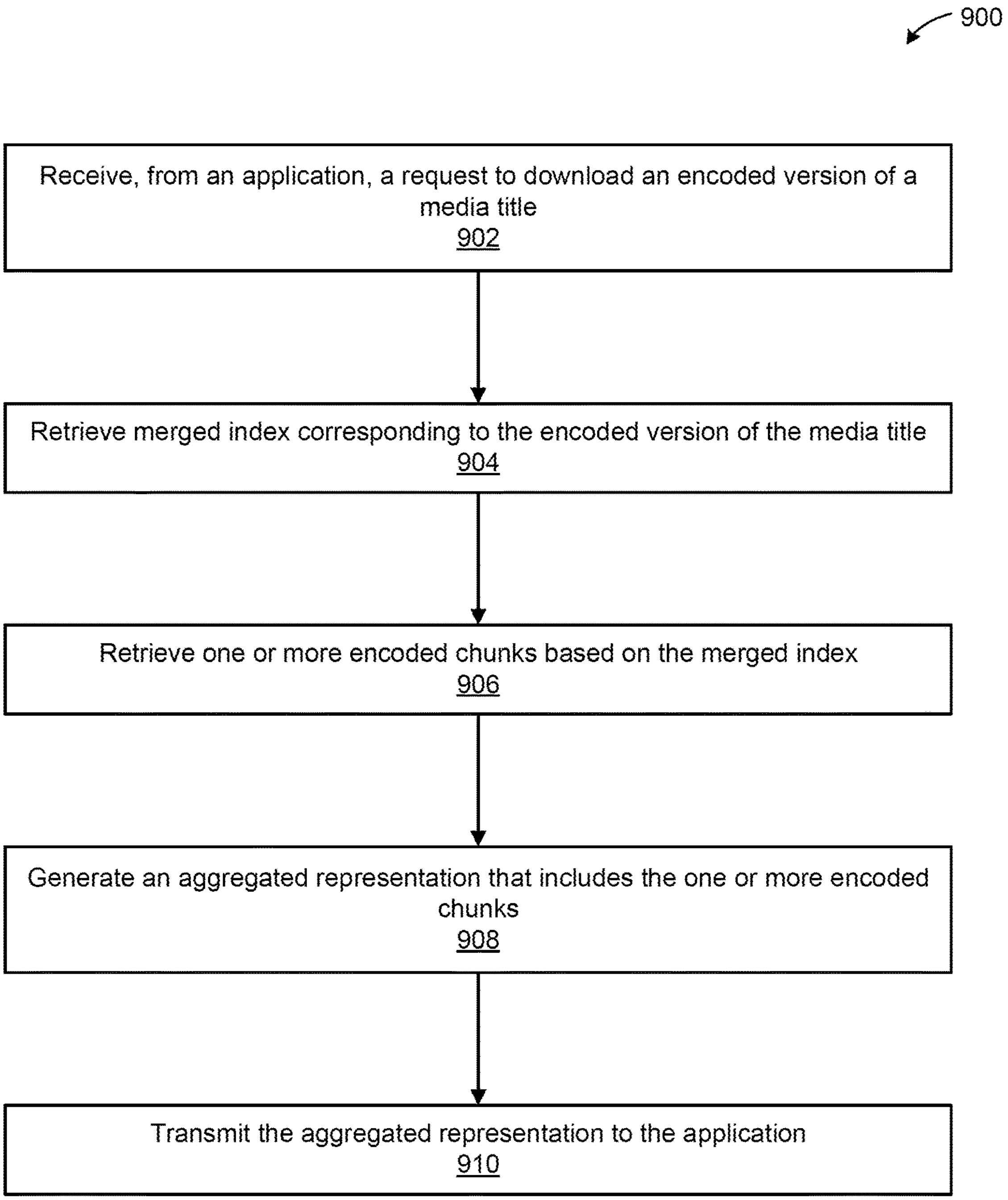
FIG. 9 is a flowchart of method steps for generating a portion of an encoded media file, according to various embodiments.

FIG. 9 is a flowchart of method steps for generating a portion of an encoded media file using an index, according to various embodiments. Although the method steps are described with reference to the systems of FIGS. 1-5, persons skilled in the art will understand that any system configured to implement the method steps, in any order, falls within the scope of the present invention.

As shown in FIG. 9, a method 900 begins at step 902, where file manager 510 receives a request from an application to download an encoded media file corresponding to an encoded version of a media title. In some embodiments, the request specifies a specific encoding. In some embodiments, the request specifies one or more portions of the encoded media file, such as one or more specific encoded chunks, one or more specific frames, or one or more ranges of frames.

At step 904, file manager 510 retrieves a merged index 516 corresponding to the encoded media file from storage 520. In some embodiments, multiple merged indices 516 correspond to the media title, where each index 516 corresponds to a different encoding of the media title. File manager 510 identifies and retrieves the specific index 516 that corresponds to the request. In some embodiments, the request from the application specifies and/or includes the index 516.

At step 906, file manager 510 retrieves one or more encoded chunks based on the merged index 516. The merged index 516 indicates one or more encoded chunks corresponding to the requested encoded media file and the location of each encoded chunk. File manager 510 retrieves the one or more encoded chunks based on the location indicated by the merged index 516. In some embodiments, the merged index 516 indicates multiple sets of encoded chunks corresponding to a media title, where each set of encoded chunks corresponds to a different encoding of the media title. File manager 510 identifies the set of encoded chunks corresponding to the requested encoded media file based on the merged index 516 and retrieves the set of encoded chunks.

In some embodiments, the request from the application specified one or more portions of the encoded media file. File manager 510 determines the one or more encoded chunks that correspond to the specified portion of the encoded media file. For example, if the request specified one or more frames, then file manager 510 determines one or more encoded chunks that include the one or more frames based on the merged index 516 and retrieves the one or more encoded chunks.

At step 908, file manager 510 generates an aggregated representation 540 that includes the one or more encoded chunks. In some embodiments, if the request from the application specified one or more portions of the encoded media file, file manager 510 generates an aggregated representation 540 that includes the portions of the one or more encoded chunks corresponding to the specified portions of the encoded media file. For example, file manager 510 could include only the frame(s) and/or group(s) of pictures in each encoded chunk that correspond to the request. In some embodiments, file manager 510 trims one or more frames from the front or the end of the aggregated representation 540 based on the request.

At step 910, file manager 510 transmits the aggregated representation 540 to the application. In some embodiments, file manager 510 transmits the aggregated representation 540 to the application by mounting the aggregated representation 540 as one or more files on a local file system of a computing instance on which the application, or an instance thereof, is executing. The application receives the aggregated representation 540 by accessing the file on the local file system of the computing instance.

In sum, a cloud-based video processing pipeline enables efficient processing of media files. The cloud-based video processing pipeline includes a chunker, encoder, assembler, and packager. The chunker divides a source media file into multiple chunks, and the encoder encodes the multiple chunks to generate multiple encoded chunks. An assembler determines location information associated with each encoded chunk and assembles the location information into an index representation of an encoded media file. In some embodiments, a packager receives the index representation and downloads the multiple encoded chunks based on the location information included in the index representation. The packager packages the multiple encoded chunks into a single packaged media file. In some embodiments, a file management application receives the index representation and downloads the multiple encoded chunks based on the location information included in the index representation. The file management application presents the multiple encoded chunks to the packager as one or more files corresponding to the multiple encoded chunks.

At least one technical advantage of the disclosed techniques relative to the prior art is that the disclosed techniques reduce the amount of overhead required when assembling and packaging multiple encoded video portions. In that regard, an assembler combines data associated with multiple encoded video portions into an index file, rather than combining multiple encoded video portions into a single encoded video file. Accordingly, with the disclosed techniques, the assembler does not need to download the multiple encoded video portions and does not need to upload the encoded video file. As a result, the network bandwidth and time required to download the input data used by the assembler, upload the output data produced by the assembler, and transmit the output data to the packager are reduced relative to prior art techniques. Additionally, the storage space used when storing the output data produced by the assembler is also reduced. These technical advantages provide one or more technological advancements over prior art approaches.

1. In some embodiments, a computer-implemented method for processing media files comprises receiving an index file corresponding to a source media file, wherein the index file indicates location information associated with a plurality of encoded portions of the source media file; retrieving one or more encoded portions included in the plurality of encoded portions from at least one storage device based on the index file; and generating at least part of an encoded version of the source media file based on the one or more encoded portions.

2. The method of clause 1, wherein the location information specifies, for each encoded portion included in the plurality of encoded portions, a location of the encoded portion within the at least one storage device.

3. The method of clauses 1 or 2, wherein the location information specifies, for each encoded portion included in the plurality of encoded portions, a location within the encoded portion that corresponds to a header of the encoded portion.

4. The method of any of clauses 1-3, wherein the location information specifies, for each encoded portion included in the plurality of encoded portions, a different location within the encoded portion corresponding to each encoded frame included in the encoded portion.

5. The method of any of clauses 1-4, wherein the location information specifies, for each encoded portion included in the plurality of encoded portions, one or more groups of frames included in the encoded portion and, for each group of frames included in the one or more groups of frames, one or more encoded frames that are included in the group of frames.

6. The method of any of clauses 1-5, further comprising receiving a request for the encoded version of the source media file from an application, wherein the one or more encoded portions are retrieved and the at least a part of the encoded version of the source media file is generated in response to the request.

7. The method of any of clauses 1-6, wherein retrieving the one or more encoded portions comprises selecting the one or more encoded portions from the plurality of encoded portions based on the request.

8. The method of any of clauses 1-7, further comprising transmitting the at least part of the encoded version of the source media file to the application for playback.

9. The method of any of clauses 1-8, further comprising storing the at least part of the encoded version of the source media file as an encoded media file within a file system accessible by the application.

10. The method of any of clauses 1-9 further comprising processing the at least part of the encoded version of the source media file to generate a packaged media file for transmission to one or more client devices.

11. In some embodiments, one or more non-transitory computer-readable media store instructions that, when executed by one or more processors, cause the one or more processors to perform the steps of receiving an index file corresponding to a source media file, wherein the index file includes location information associated with a plurality of encoded portions of the source media file; retrieving one or more encoded portions included in the plurality of encoded portions from at least one storage device based on the index file; and generating at least part of an encoded version of the source media file based on the one or more encoded portions.

12. The one or more non-transitory computer-readable media of clause 11, wherein the location information specifies, for each encoded portion included in the plurality of encoded portions, a location of the encoded portion within the at least one storage device.

13. The one or more non-transitory computer-readable media of clauses 11 or 12, wherein the location information specifies, for each encoded portion included in the plurality of encoded portions, a location within the encoded portion that corresponds to a header of the encoded portion.

14. The one or more non-transitory computer-readable media of any of clauses 11-13, wherein the location information specifies, for each encoded portion included in the plurality of encoded portions, a different location within the encoded portion corresponding to each encoded frame included in the encoded portion.

15. The one or more non-transitory computer-readable media of any of clauses 11-14, wherein the location information specifies, for each encoded portion included in the plurality of encoded portions, one or more groups of frames included in the encoded portion and, for each group of frames included in the one or more groups of frames, one or more encoded frames that are included in the group of frames.

16. The one or more non-transitory computer-readable media of any of clauses 11-15, further comprising receiving a request for the encoded version of the source media file from an application, wherein the index file is retrieved in response to the request.

17. The one or more non-transitory computer-readable media of any of clauses 11-16, further comprising receiving a request for the encoded version of the source media file from an application, wherein retrieving the one or more encoded portions comprises selecting the one or more encoded portions from the plurality of encoded portions based on the request.

18. The one or more non-transitory computer-readable media of clauses 11-17, wherein the request specifies one or more frames included in the source media file, and selecting the one or more encoded portions from the plurality of encoded portions comprises determining that the one or more encoded portions correspond to the one or more frames based on the index file.

19. The one or more non-transitory computer-readable media of clauses 11-18, further comprising receiving a request for the encoded version of the source media file from an application, wherein the request specifies the at least part of an encoded version of the source media file, and the one or more encoded portions are retrieved and the at least a part of the encoded version of the source media file is generated in response to the request.

20. In some embodiments, a system comprises one or more memories storing instructions; and one or more processors that are coupled to the one or more memories and, when executing the instructions, perform the steps of receiving an index file corresponding to a source media file, wherein the index file includes location information associated with a plurality of encoded portions of the source media file; retrieving one or more encoded portions included in the plurality of encoded portions from at least one storage device based on the index file; and generating at least part of an encoded version of the source media file based on the one or more encoded portions.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing media files, the method comprising:

receiving, by a packager included in a video processing pipeline, an index file corresponding to a source media file, wherein the index file includes location information associated with a plurality of encoded portions of the source media file, and the index file also includes metadata indicating one or more video encoding properties of the plurality of encoded portions of the source media file, wherein the metadata is separate from the location information within the index file, and wherein an assembler included in the video processing pipeline receives the metadata associated with the plurality of encoded portions of the source media file independently of the plurality of encoded portions of the source media file, and the assembler generates the index file based on the metadata independently of the plurality of encoded portions of the source media file;

retrieving two or more encoded portions included in the plurality of encoded portions from at least one storage device based on the index file; and generating a packaged media file based on the two or more encoded portions, wherein the packaged media file is subsequently streamed to a client device for playback.

2. The method of claim 1, wherein the location information specifies, for each encoded portion included in the plurality of encoded portions, a location of the encoded portion within the at least one storage device.

3. The method of claim 1, wherein the location information specifies, for each encoded portion included in the plurality of encoded portions, a location within the encoded portion that corresponds to a header of the encoded portion.

4. The method of claim 1, wherein the location information specifies, for each encoded portion included in the plurality of encoded portions, a different location within the encoded portion corresponding to each encoded frame included in the encoded portion.

5. The method of claim 1, wherein the location information specifies, for each encoded portion included in the plurality of encoded portions, one or more groups of frames included in the encoded portion and, for each group of frames included in the one or more groups of frames, one or more encoded frames that are included in the group of frames.

6. The method of claim 1, further comprising receiving a request for an encoded version of the source media file from an application, wherein the two or more encoded portions are retrieved and the packaged media file is generated in response to the request.

7. The method of claim 6, wherein retrieving the two or more encoded portions comprises selecting the two or more encoded portions from the plurality of encoded portions based on the request.

8. The method of claim 6, further comprising transmitting the packaged media file to the application for playback.

9. The method of claim 6, further comprising storing the packaged media file as an encoded media file within a file system accessible by the application.

10. The method of claim 1, wherein the location information associated with the plurality of encoded portions includes first location information for each encoded portion included in the plurality of encoded portions, and the assembler combines the first location information for each encoded portion when generating the index file.

11. The method of claim 1, wherein the metadata specifies at least one of a size of a header within a first encoded portion of the plurality of encoded portions, an order of groups of pictures within the first encoded portion, an order of frames within the first encoded portion, an identifier or sequence number associated with the first encoded portion, or a sequence number or frame number associated with each frame included in the first encoded portion.

12. One or more non-transitory computer-readable media storing instructions that, when executed by one or more processors, cause the one or more processors to perform the steps of:

receiving, by a packager included in a video processing pipeline, an index file corresponding to a source media file, wherein the index file includes location information associated with a plurality of encoded portions of the source media file, and the index file also includes metadata indicating one or more video encoding properties of the plurality of encoded portions of the source media file, wherein the metadata is separate from the location information within the index file, and wherein an assembler included in the video processing pipeline receives the metadata associated with the plurality of encoded portions of the source media file independently of the plurality of encoded portions of the source media file, and the assembler generates the index file based on the metadata independently of the plurality of encoded portions of the source media file;

retrieving two or more encoded portions included in the plurality of encoded portions from at least one storage device based on the index file; and generating a packaged media file based on the two or more encoded portions, wherein the packaged media file is subsequently streamed to a client device for playback.

13. The one or more non-transitory computer-readable media of claim 12, wherein the location information specifies, for each encoded portion included in the plurality of encoded portions, a location of the encoded portion within the at least one storage device.

14. The one or more non-transitory computer-readable media of claim 12, wherein the location information specifies, for each encoded portion included in the plurality of encoded portions, a location within the encoded portion that corresponds to a header of the encoded portion.

15. The one or more non-transitory computer-readable media of claim 12, wherein the location information specifies, for each encoded portion included in the plurality of encoded portions, a different location within the encoded portion corresponding to each encoded frame included in the encoded portion.

16. The one or more non-transitory computer-readable media of claim 12, wherein the location information specifies, for each encoded portion included in the plurality of encoded portions, one or more groups of frames included in the encoded portion and, for each group of frames included in the one or more groups of frames, one or more encoded frames that are included in the group of frames.

17. The one or more non-transitory computer-readable media of claim 12, further comprising receiving a request for an encoded version of the source media file from an application, wherein the index file is retrieved in response to the request.

18. The one or more non-transitory computer-readable media of claim 12, further comprising receiving a request for an encoded version of the source media file from an application, wherein retrieving the two or more encoded portions comprises selecting the two or more encoded portions from the plurality of encoded portions based on the request.

19. The one or more non-transitory computer-readable media of claim 18, wherein the request specifies two or more frames included in the source media file, and selecting the two or more encoded portions from the plurality of encoded portions comprises determining that the two or more encoded portions correspond to the two or more frames based on the index file.

20. The one or more non-transitory computer-readable media of claim 12, further comprising receiving a request for an encoded version of the source media file from an application, wherein the two or more encoded portions are retrieved and the packaged media file is generated in response to the request.

21. A system comprising:

one or more memories storing instructions; and one or more processors that are coupled to the one or more memories and, when executing the instructions, perform the steps of:

receiving, by a packager included in a video processing pipeline, an index file corresponding to a source media file, wherein the index file includes location information associated with a plurality of encoded portions of the source media file, and the index file also includes metadata indicating one or more video encoding properties of the plurality of encoded portions of the source media file, wherein the metadata is separate from the location information within the index file, and wherein an assembler included in the video processing pipeline receives the metadata associated with the plurality of encoded portions of the source media file independently of the plurality of encoded portions of the source media file, and the assembler generates the index file based on the metadata independently of the plurality of encoded portions of the source media file;

retrieving two or more encoded portions included in the plurality of encoded portions from at least one storage device based on the index file; and generating a packaged media file based on the two or more encoded portions, wherein the packaged media file is subsequently streamed to a client device for playback.

* * * * *